United States Patent [19]

Tokushima

[11] Patent Number: 4,786,836
[45] Date of Patent: Nov. 22, 1988

[54] PIEZOELECTRIC MOTOR

[75] Inventor: Akira Tokushima, Kyoto, Japan

[73] Assignee: Matsushita Electric Industrail Co., Ltd., Kadoma, Japan

[21] Appl. No.: 706,387

[22] Filed: Feb. 27, 1985

[30] Foreign Application Priority Data

Mar. 1, 1984 [JP] Japan .................................. 59-39801
Jul. 27, 1984 [JP] Japan .................................. 59-155147

[51] Int. Cl.⁴ ............................................. H01L 41/08
[52] U.S. Cl. ...................................... 310/323; 310/12; 310/328
[58] Field of Search ........... 310/12, 323, 328, 321-322

[56] References Cited

U.S. PATENT DOCUMENTS

| 4,400,641 | 8/1983 | Vishnevsky et al. | 310/323 |
| 4,453,103 | 6/1984 | Vishnevsky et al. | 310/323 |
| 4,484,099 | 11/1984 | Kawai et al. | 310/323 X |
| 4,504,760 | 3/1985 | Yamamoto et al. | 310/323 |
| 4,510,411 | 4/1985 | Hakamata et al. | 310/328 X |
| 4,513,219 | 4/1985 | Katsuma et al. | 310/328 |
| 4,562,373 | 12/1985 | Tokushima et al. | 310/323 X |
| 4,562,374 | 12/1985 | Sashida et al. | 310/323 X |
| 4,580,073 | 4/1986 | Okumura et al. | 310/323 |
| 4,587,452 | 5/1986 | Okumura et al. | 310/323 X |

*Primary Examiner*—Patrick R. Salce
*Assistant Examiner*—Emanuel Todd Voeltz
*Attorney, Agent, or Firm*—Cushman, Darby & Cushman

[57] ABSTRACT

A piezoelectric motor or a piezoelectric linear motor comprises a stator (44) having two piezoelectric vibrating members (38, 39) and a substrate (40) which is made of an acoustic substance and has vibration transmitting member (41), and sliders (55, 56) which contact a vibration transmitting member (41) formed on said stator (44) at parts of maximum displacement of the stator (44).

36 Claims, 14 Drawing Sheets

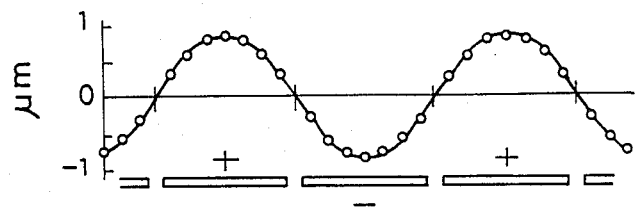
FIG.4(a)
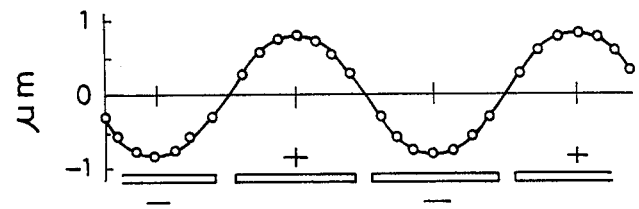
FIG.4(b)
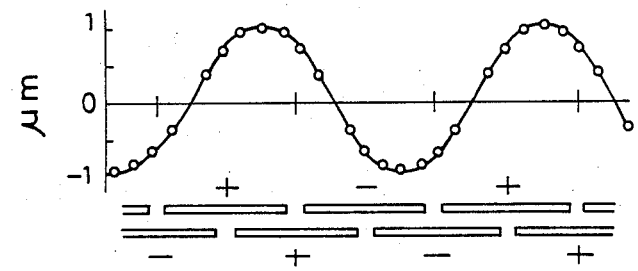
FIG.4(c)
FIG.5
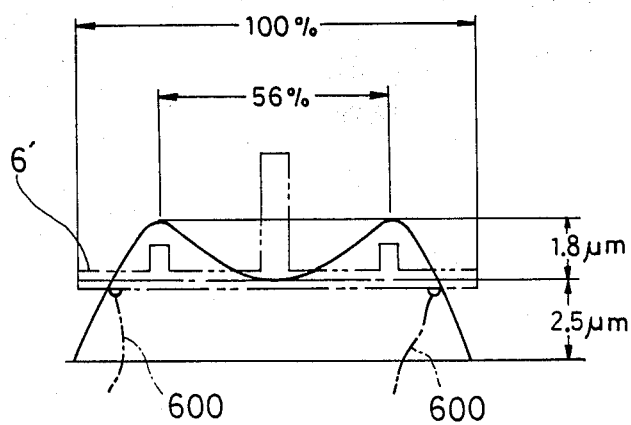

PIEZOELECTRIC MOTOR

BACKGROUND OF THE INVENTION

1. FIELD OF THE INVENTION

The present invention relates to a piezoelectric motor which generates a rotary or linear driving motion by using a piezoelectric substance as its driving element.

2. DESCRIPTION OF THE PRIOR ART

In recent years, a piezoelectric motor which produces a rotary or running motion by exciting various ultrasonic vibrations using an electro-mechanical transducer such as a piezoelectric ceramic or the like has been drawing attention because of its having a high energy density and other advantageous features.

Firstly, a description is made of the conventional piezoelectric motor utilizing these ultrasonic vibrations in reference to the drawings.

In the conventional piezoelectric motor reported in the Nikkei Mechanical (Feb. 28, 1983), an annular piezoelectric element is bonded to the surface of a thick metal ring or the like into one body to be employed as a stator.

When AC signals which are phase-shifted from each other, in the same way as in two-phase or three-phase motor, are applied to the conventional piezoelectric motor constituted as described above, expansion and contraction take place in the circumferential direction of the piezoelectric element. A bending travelling wave is generated on the above-mentioned stator.

A piezoelectric motor which utilizes a Rayleigh wave has also been proposed. This wave propagates in the vicinity of the surface of the substance having both components of the longitudinal wave and the transverse wave. FIG. 1 is a magnified view of a small part showing a state of contact of the stator 100 of the conventional piezoelectric motor with a slider 200 in contact with the surface thereof. The motion of material particles attending the bending wave have an elliptic locus when observed at a point A on the surface of an elastic body of the stator 100; the point A depicts an elliptic locus of "W" of major axis and 2u of minor axis. At a peak where the elastic body comes in contact with the slider 200, the point A has a velocity of $V = 2\pi f$ in the negative direction of the X-axis. Resultantly, the slider 200 is driven at a velocity of V in the direction opposite to that of travel of the wave by a friction force with the elastic body. Thus, by depicting the elliptic locus as a driving force on the surface of the elastic body, the conventional piezoelectric motor drives the contacting slider 200 to rotate. Such a driving principle is clarified also in the Japan Patent Publication No. Sho 58-32518, and a concept of use of traveling wave consisting of the longitudinal wave and the transverse wave is disclosed such that, by exciting the longitudinal vibration and the transverse vibration generated at a frictional contact part by the same frequencies with the phase shifted from each other, a force in the transverse direction is generated to move an object in contact therewith.

The conventional configuration as mentioned above has the following various problems.

(1) The stress required for obtaining the vibration mode of a driving principle shows a maximum value at the surface of the stator. In a case of the stator of 3 mm in thickness, the vertical stress becomes about 2,000 kg/mm², and the power required for this stress becomes about 100–1000 times the theoretical value of the bimorph.

(2) Because the neutral point of vibration is located within an elastic body provided in the stator such as metal or the like, the piezoelectric substance as an electro-mechanical transducer does not become an efficient drive, but becomes an inefficient maximum displacement position drive. According to this driving principle, $\frac{2}{3}$ or more of the total energy becomes useless, even if only the piezoelectric body as a driving source is concerned.

(3) Because the driving force is picked up from a very small amplitude of about 0.25 μm or less, the slider in uniform contacts with both maximum displacement point and minimum displacement point having different occurrence speeds and the directions thereof, respectively, and the slider velocity becomes a slow speed close to the integrated value. For this reason, a large power of as much as 10–100 times that of the magnetic motor is required to obtain a practical rotation speed, torque and the like.

(4) In the conventional piezoelectric motor, the driving electrode is divided into two pairs, A and B. The effective drive area never exceeds 50%. Therefore only a weak vibration, never exceeding 50% could be obtained by this electrode.

SUMMARY OF THE INVENTION

The present invention defines a piezoelectric rotary motor and a piezoelectric linear motor wherein a highly efficient piezoelectric vibrator is employed as an electro-mechanical transducer.

In order to achieve the above-mentioned object, the piezoelectric motor picks up a rotation energy or a driving energy most efficiently in a manner that, by installing a part of vibrators to transmit vibration on the surface of the stator.

Configuration of the present motor is such that: two plate-shaped piezoelectric vibrators are constituted by being divided into at least a pair of regions wherein directions of polarization of the regions are reversed alternatingly; and the vibrators are so disposed that each boundary between the above-mentioned regions of one plate-shaped piezoelectric vibrator is located in the vicinity of each central part of the above-mentioned region of the other; a stator is constituted by piling a substrate composed of an acoustic material and the like together with both of the above-mentioned two piezoelectric vibrators in a multi-layered fashion; a slider is provided facing the stator; and a vibration transmitting member contacting with the above-mentioned slider is provided on a contact surface of the above-mentioned stator.

When the piezoelectric vibrator of the stator having the configuration as described above is driven by two voltages with predetermined forced excitation frequencies whose phases are shifted from each other, for example, an addition of a sine wave function and a cosine wave function is performed. A composite vibration of the stator caused by the two piezoelectric vibrators makes positions of maximum amplitude move with time in a predetermined direction, and the slider in contact with the positions receive the driving force in that direction. Thereby, when a slider is a rotary slider, it obtains a rotary motion, and when a slider is a linear slider, it obtains a linear motion.

BRIEF DESCRIPTION OF THE DRAWINGS

FIGS. 4A-4C and FIG. 5 are charts showing strain distributions at driving of the stator of the piezoelectric rotary motor in FIG. 3.

DESCRIPTION OF THE PREFERRED EMBODIMENTS

Figure 2:
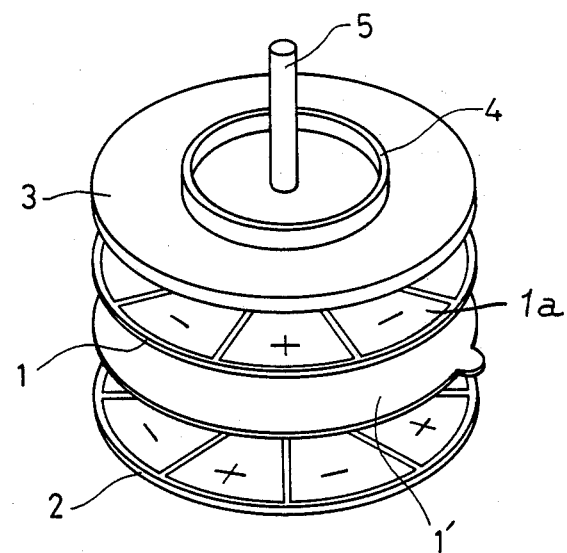
FIG. 2 is an exploded perspective view of a stator of a piezoelectric rotary motor in one embodiment in accordance with the present invention.

Detailed description is made on an embodiment in accordance with the present invention with reference to the drawings. A stator has, for example, a structure as shown in FIG. 2. On the surface of a disc-shaped first piezoelectric vibrator 1, for example, eight electrodes 1a are installed by dividing the disc into regions of 45° each. These electrodes 1a are formed on the first piezoelectric vibrator 1 by a method such as printing, vapor deposition, plating or the like using a conductive material such as silver, silver palladium, rhodium, nickel or the like. Electrodes are also provided on the back surface (not illustrated) along with the above-mentioned surface electrodes may be divided or not divided. Polarization is carried out in the manufacturing process by applying a high voltage to each electrode of the first piezoelectric vibrator 1 so that the directions of polarization of adjacent electrodes differ from each other. For example, an eight-electrode, four-pair forced vibrator is constituted to consist of regions having the positive polarity and the negative polarity alternately as shown in FIG. 2. The electrodes 1a are series connected so that a voltage can be applied to the electrodes as a whole. A disc-shaped second piezoelectric vibrator 2 also has the same structure and is constituted so as to have the positive polarity and the negative polarity alternately.

A central position of each electrode of the above-mentioned first piezoelectric vibrator is in the vicinity of the position of boundary between adjacent electrodes of the second vibrator 2. Then, both the piezoelectric vibrators 1 and 2 are superposed so that the boundaries between adjacent electrodes which are the positions of minimum amplitude of the first piezo-electric vibrator 1 are located in the vicinities of the centers of the electrode which are the positions of maximum amplitude of the second piezoelectric vibrator 2.

The first piezoelectric vibrator 1 and the second piezoelectric vibrator 2 are mounted on a stator substrate 3 having a thickness equal to about 100 times that of the piezoelectric vibrator in a piled up fashion, with an electrode 1' for applying electric field sandwiched inbetween. The stator substrate 3 is made by using an acoustic material, friction material and the like selected from a group consisting of aluminum, brass, iron, stainless steel or quenched steel, synthetic resin material such as nylon or the like, ceramic material, glass material and composite material thereof or the like. In addition, on the surface of the above-mentioned stator substrate 3, for example, a protrusion 4 as a vibration transmitting member is formed in the vicinity of a maximum displacement position which is about ¼ of diameter from the center, and a shaft 5 is formed in the center.

Figure 3:
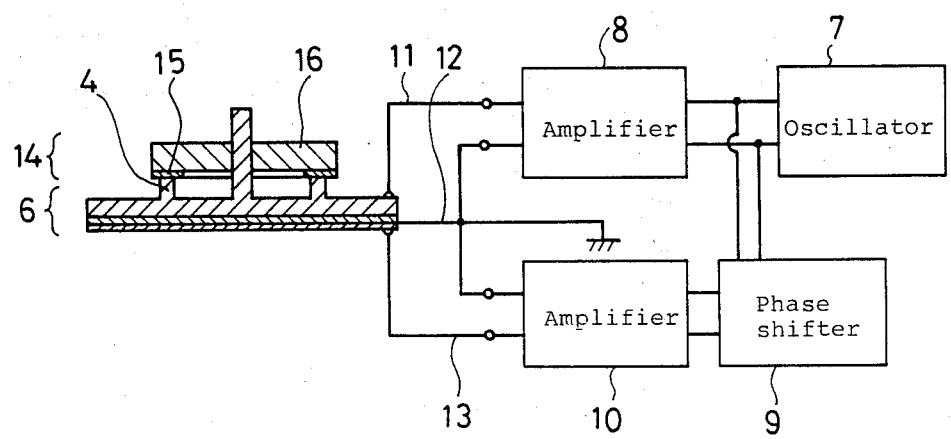
FIG. 3 is a cross-sectional view showing an outline of a piezoelectric rotary motor using the same stator and a driving circuit thereof.

The components assembled as described above is employed as a stator 6 as shown in FIG. 3. As shown in FIG. 3, an output signal from an oscillator 7, of a forced vibration driving frequency determined by the stator 6, is branched with one output being input directly to an amplifier 8 and the other being input to an amplifier 10 through a phase shifter 9. The above-mentioned phase shifter 9 shifts phase of the signal by an extent of a range of ±10°–±170° of use for the forward rotation or the reverse rotation as described later. A signal which is obtained by oscillator 7 is applied to the first piezoelectric vibrator 1 through leads 11 and 12. Consequently, in the stator 6, four wave lengths corresponding to the eight-electrode are generated. The second piezoelectric vibrator 2 is also driven likewise by applying the output of the amplifier 10 through the leads 12 and 13.

FIG. 4 shows the results of measuring the strain in the longitudinal direction when an electric signal is applied to the first piezoelectric vibrator 1 in FIG. 4(a) or the second piezoelectric vibrator 2 in FIG. 4(b). An He-Ne gas laser light is irradiated onto the place of measurement, and the measurement was conducted by employing the method of interference of incident light with reflected light. FIG. 4(a) shows the results of the measurement of the strain when the first piezoelectric vibrator 1 is driven with the signal applied to the leads 11 and 12. An amplitude of about ±0.8 μm was shown at an application of 50V. The position of minimum amplitude is in the vicinity of each boundary between adjacent electrodes, and the position of maximum amplitude is in the vicinity of each center of the electrodes. FIG. 4(b) shows the results of the measurement of the strain in the longitudinal direction when the second piezoelectric vibrator 2 was driven likewise. An amplitude of about ±0.8 μm was shown at an application of 50V. The position of minimum amplitude is in the vicinity of each boundary between adjacent electrodes, and the position of maximum amplitude is in the vicinity of each center of the electrodes.

Next, FIG. 4(c) shows the results of the measurement of the strain when the first piezoelectric vibrator 1 and the second piezoelectric vibrator 2 were driven simultaneously by the same frequency when the phase shifter is removed. In the distribution of the strain in the longitudinal direction, the position showing a maximum amplitude is moved to a middle position between those of FIG. 4(a) and FIG. 4(b). Also, the maximum amplitude of the strain in the longitudinal direction is increased by about 1.3 times. Here, as described above, the second piezoelectric vibrator 2 is driven with a phase shift of ±10°−±170° from the first piezoelectric vibrator, and therefore the position of maximum amplitude of a composite wave of FIG. 4(c) moves with time in a predetermined direction.

Figure 1:
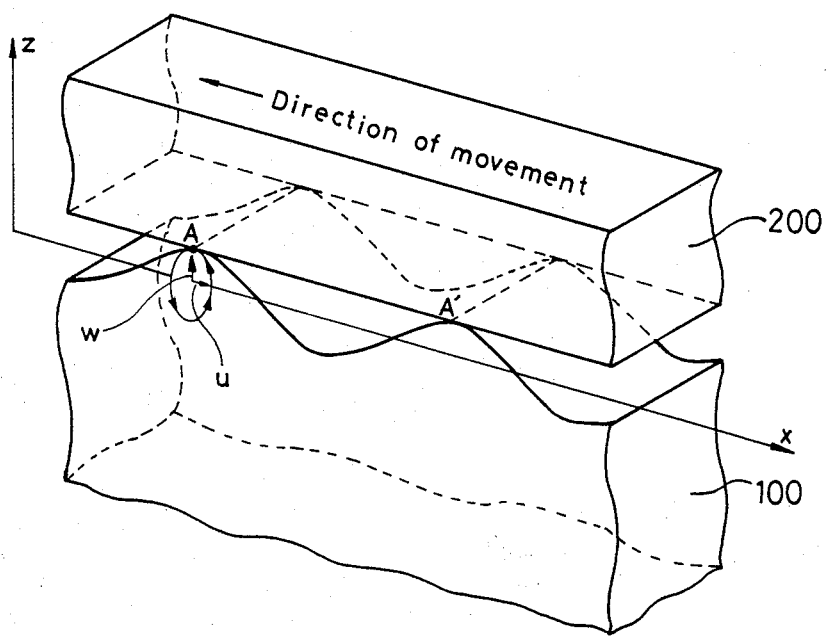
FIG. 1 is the perspective view showing the operation of the conventional piezoelectric motor.

A slider 14 is disposed in contact with the top of the stator 6. The slider 14 is constituted with an elastic body 15 composed of a friction material, elastic material or the like and an acoustic material coupled thereto. When the stator 6 is driven as described above, a peak point of vibration of the stator 6 becomes in contact with the slider 14, and this peak point moves with time. and Therefore a force having a transverse component acts on the slider 14. Thus, the slider 14 repeats the positional movement caused by the transverse component at a driving frequency determined by the stator 6, and resultantly a rotary motion within a range of about several to several thousands of revolutions per minutes can be obtained. The generated torque varies depending upon the acoustic material constituting the stator 6 and the coefficient of friction, area of contact and the magnitude of load of the slider which is in surface contact with the stator or the like, and a torque ranging from several tens to several thousands of gf.cm could be obtained. Furthermore, for the direction of rotation, when the reference signal applied to first vibrator and the phase-shifted signal within a range of +10°−+170° with respect to the reference signal applied to the second piezoelectric vibrator, the rotation is defined as in the forward direction, the rotation obtained when driven with the signal phase-shifted within a range of −10°−170° becomes in the reverse direction. The revolution speed can be arbitrarily changed by selecting the magnitude or phase of the signal. In the conventional system, an increase of the minor axis 2u of the elliptic locus in FIG. 1 must be increased of the thickness of the vibrator. But such an increase of the thickness of the vibrator requires a drive by a large electric power. This induces a rise of temperature of the vibrator. In this invention, a vibration transmitting member formed on the center of the vibrator as shown in FIGS. 2 and 3 have the same magnitude of strain as the conventional system.

Figure 13:
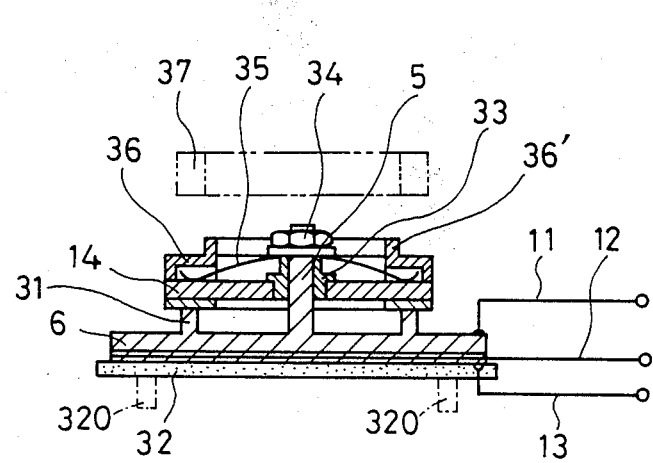
FIG. 13 is a fragmental sectional front view showing a major specific structure of a piezoelectric motor in one embodiment in accordance with the present invention.

FIG. 5 shows the results of the measurement of the strain in the longitudinal direction. The strain was measured by interference method. A maximum strain of about 1.8 μm was shown at 50V in the top of the protrusion 4 which is a vibration transmitting member as shown in FIG. 2. The node of vibration is located at a position of 40–43% of the diameter from the center and the strain is 2.5 μm at the end point. In addition, by wiring the leads for applying electric signals 11, 12 and 13 in the vicinity of the above-mentioned vibration node, breaking of leads was eliminated completely. Furthermore, as shown in FIG. 13 as described later, for the practical structure, a buffer body 32 of, for instance, rubber or felt or the like vibration-absorbing substance is provided under the stator 6. In this case, the above-mentioned stator 6 bends as shown in vertically exaggerated manner in FIG. 5, with the above-mentioned buffer body 32 acting as a substrate, and therefore, an apparent magnifying of amplitude is obtainable. As a result, the transverse component as driving force of the slider 14 at the protrusion 4 is increased, and thereby the above-mentioned slider 14 moves very efficiently in a specified direction. Also, by setting the position of support in the vicinity of the node, a drive with less loss can be realized.

Figure 6:
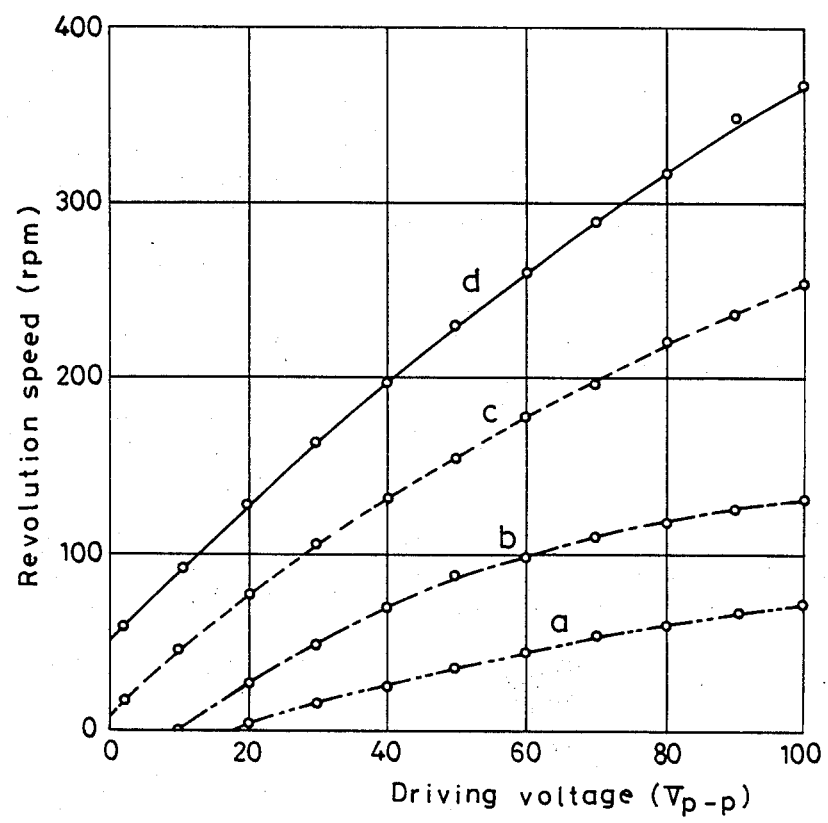
FIG. 6 is a graph showing characteristics of revolution speed versus driving voltage of the piezoelectric rotary motor in accordance with the present invention.

FIG. 6 shows relationships between the driving voltage and revolution speed of a piezoelectric motor in accordance with the present invention. A curve a shows a characteristic of the conventional surface waveform piezoelectric motor for comparison. A curve b shows a characteristic of a piezoelectric motor without a protrusion in accordance with the present invention. A curve c shows a characteristic of a piezoelectric motor with a protrusion of 4 mm in length in the vertical direction (i.e. height) in accordance with the present invention. A curve d shows a characteristic of a piezoelectric motor with a protrusion 4 of 8 mm in length in the vertical direction in accordance with the present invention. Thus, by varying the length in the vertical direction of the protrusion 4 as a member of the stator, various desired running speeds could be obtained. It is understood from the above-description that the piezoelectric motor in accordance with the present invention is extremely efficient. In an example shown in FIG. 6, the maximum speed was 360 rpm. However, in another example having a stator of a smaller diameter of the above-mentioned protrusion 4 than the above examples, a speed of about 1,000 rpm could be measured. In addition, the power consumption at this time became about 1/10–1/100 in comparison with that of the conventional piezoelectric motor. Furthermore, the efficiency of the output became the same value as that of the DC micro motor or the like.

Figure 7:
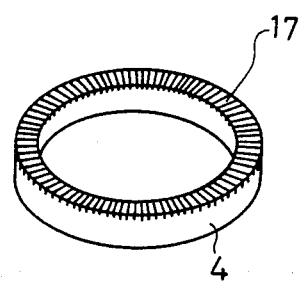
FIG. 7 is perspective view of the major part of a stator of the same motor.

FIG. 7 shows one example of configuration of the protrusion 4 forming part of the stator. On the surface of the protrusion 4 in contact with the slider 14, a plurality of knife-edge-shaped grooves 17 which, are etched or machine-worked crosswisely with pitch of every 1° to several tens of degrees in the depth of about several μm to several tens of mm (in some case the protrusion is thicker than several tens of mm) are provided in the radial direction, i.e., orthogonal to the direction of movement of the above-mentioned slider 14. These grooves 17 have an effect of cleaning powder produced by wear due to rotation of the protrusion 4 and the slider 14 and the like. The powder by wear is led in the above-mentioned grooves 17 to be carried outside. Consequently, both the contact surfaces of the above-mentioned protrusion 4 and the slider 14 could keep the initial coefficient of friction and contact area even after a long service time, and thereby the produced torque was always constant.

Figure 8:
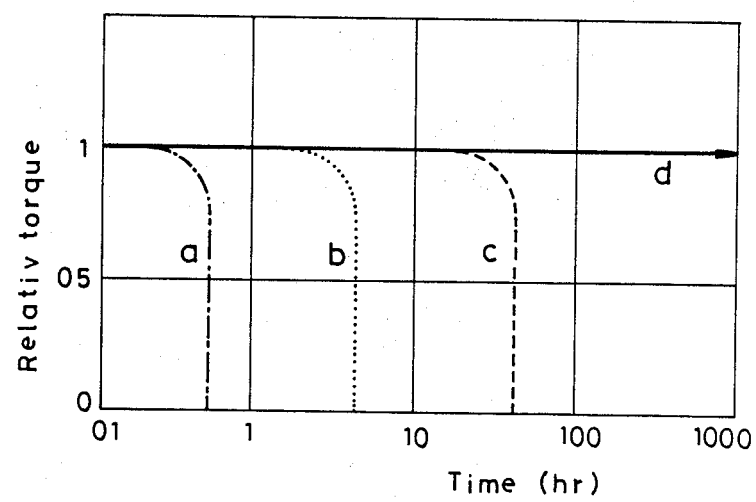
FIG. 8 is a graph showing characteristics of operation time of the same motor.

FIG. 8 shows relations between output torques and the service of driving time for various materials of the protrusions 4 and the elastic body 15 of the slider 14. A curve a shows the operating time when the elastic body 15 is constituted with a material wherein asbestos or the like is combined with a rubber-containing binder. A curve b shows the operating time when a material for structure such as quenched steel or the like is used for the material of the protrusion 4. A curve c shows the operating time when the elastic body 15 is constituted with a material wherein pulp, silica or the like is combined with a synthetic-resin-containing binder. A curve d, as shown in FIG. 7, shows the life-time characteristic when knife-edge-shaped grooves are provided to clean the powder by wear due to rotation of the protrusion 4, and this curve shows that the initial characteristic of torque is reserved even after service of about 1,000 hours or more.

Revolution number in the region of stable operation of the conventional piezoelectric motor is limited to several rpm to about 30 rpm. This is based on the driving principle of a bending travelling wave using a very small amplitude of order of submicrons, and the conventional piezoelectric motor features a low speed typically usable only for driving the camera lens or the like.

Figure 9:
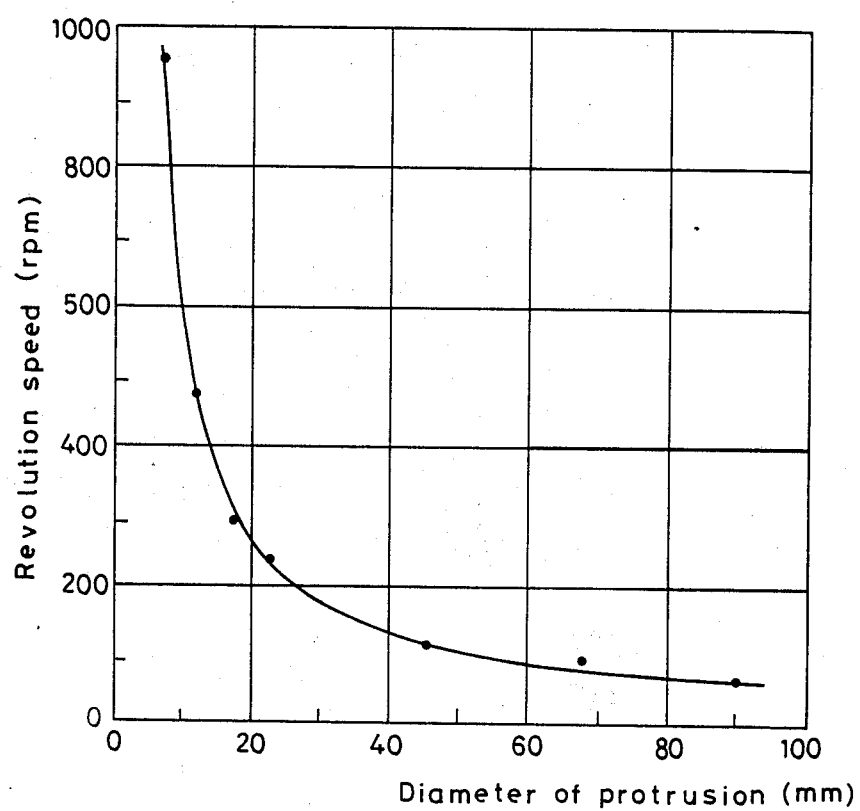
FIG. 9 is a graph showing a characteristics of revolution speed versus diameter of the major part of a stator of a piezo-electric motor in accordance with the present invention.

FIG. 9 shows a relationship between revolution speed and the diameter of the protrusion 4. In FIG. 9, a revolution speed is obtained from several to about 1,000 revolutions per minute.

In addition, since from the principle of operation and configuration, no magnetic means such as a magnet, coil or the like is used as components, and an ideal motor completely free from the magnetic effect operable at about 400 rpm to 700 rpm is obtainable. This is very useful for the magnetic recording/reproducing equipment such as the floppy disk, videotape recorder or the like.

Figure 10:
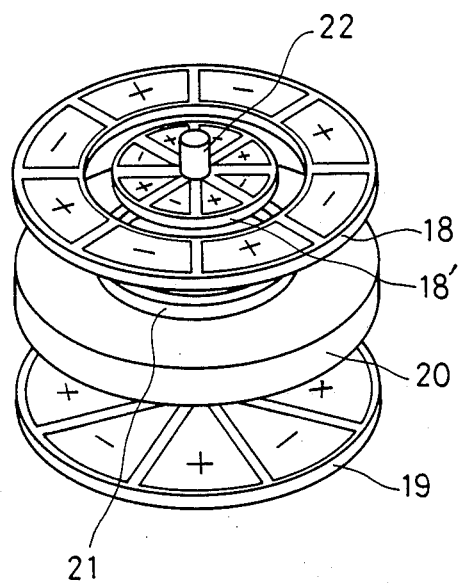
FIGS. 10, 11 and 12 are exploded perspective views of stators of a piezoelectric rotary motor in other embodiments in accordance with the present invention, respectively.

FIG. 10 shows a stator having another configuration. The basic idea of this configuration is that substrate 20 having a thickness equal to 100 times that of the above-mentioned piezoelectric vibrators is mounted between a first piezoelectric vibrator 18 of outer side and 18' of inner side and a second piezoelectric vibrator 19. Also, on the surface of the above-mentioned stator substrate 20, a shaft 22 and a protrusion 21 are formed in the vicinity of the center and of the maximum displacement position i.e. about $\frac{1}{4}$ of the diameter, respectively. The material and structure of each member are the same as those of the embodiment in FIG. 2. Relative arrangement of polarity of the first piezoelectric vibrators 18 and 18' and the second piezoelectric vibrator 19 is quite the same as that of the stator 6 constituted as shown in FIG. 2 and FIG. 3. In order to take out driving force from the protrusion 21 disposed at maximum displacement positions, a circular gap is formed between the vibrator 18 and 18' by dividing the piezoelectric vibrator into two pieces 18 and 18'. Furthermore, quite the same configurarion as that of the circuit as shown in FIG. 3 can be used for a circuit of driving this stator.

Figure 11:
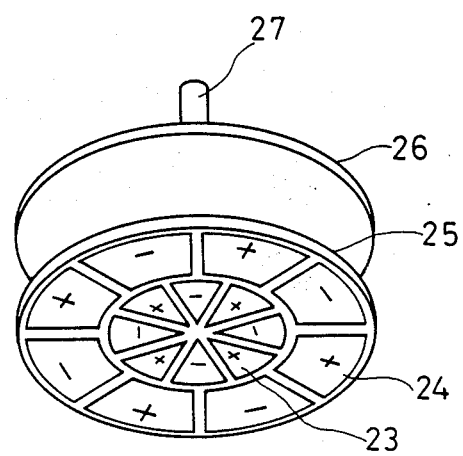

FIG. 11 shows a stator in still another embodiment. The basic configuration of the present embodiment is to provide a piezoelectric vibrator 25 having a first piezoelectric vibrator electrode 23, a second piezoelectric vibrator electrode 24 and a stator substrate 26 of a thickness equal to about 100 times that of the above-mentioned piezoelectric vibrator. Furthermore, on the surface of the above-mentioned stator substrate 26, an annular protrusion (not illustrated but similar as the preceding examples) and a shaft 27 are formed in the vicinity of the maximum displacement, position which is about $\frac{1}{4}$ of the diameter and at a center thereof. The material and structure of each member are the same as those of the embodiment in FIG. 2. Relative arrangement of polarization of the first piezoelectric vibrator electrode 23 and the second piezoelectric vibrator electrode 24 is quite the same as those of the stator 6 constituted as shown in FIG. 2 and FIG. 3. In addition, quite the same configuration as that of the circuit as shown in FIG. 3 can be used for a circuit for driving this stator, but detailed description is omitted.

Figure 12:
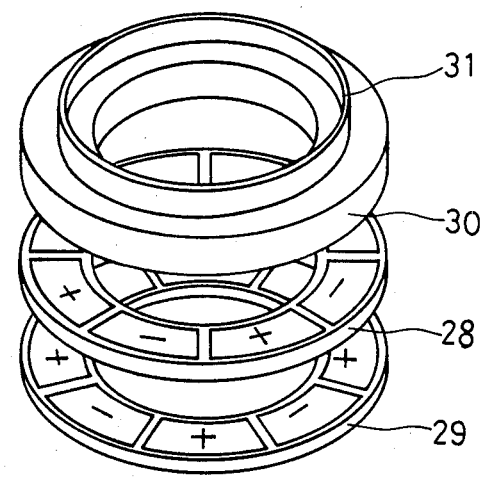

FIG. 12 shows a stator in still another embodiment. The basic configuration of this embodiment is that an annular stator substrate 30 having a thickness equal to about 100 times that of the above-mentioned piezoelectric vibrator is provided on an annular first piezoelectric vibrator 28 and an annular second piezoelectric vibrator 29. Also, a protrusion 31 is formed in the vicinity of the position of maximum amplitude in the longitudinal direction, on the surface of the above-mentioned stator substrate 30. The material and structure of each member are the same as those of the embodiment in FIG. 2. Relative arrangement of polarization of the first piezoelectric vibrator 28 and the second piezoelectric vibrator 29 is quite the same as that of the stator 6 constituted as shown in FIG. 2 and FIG. 3. The strain in the longitudinal direction was measured by applying 50V at a forced vibration frequency determined by each stator to the stators in FIG. 10, FIG. 11 and FIG. 12 by using the driving circuit in FIG. 3, and quite the same results as those in FIG. 4 were obtained for the strain in the longitudinal direction.

Motors of nearly the same configuration as that of the piezoelectric motor shown in FIG. 13 in accordance with the present invention as described later were driven by combining with these stators, and rotary motions within a range of nearly several to several thousands of revolutions per minute could be obtained. The generated torque varies depending upon the above-mentioned acoustic material constituting the stator and the coefficient of friction, contact area and the magnitude of load of the slider in surface contact with the above-mentioned stator and the like, and torques ranging from several tens of gf.cm to several thousands of gf.cm could be obtained.

FIG. 13 shows a more concrete structure of a piezoelectric motor as one embodiment in accordance with the present invention. The same parts as in FIG. 3 are designated by the same numbers. The stator 6, whereto the leads 11, 12 and 13 are attached, is mounted in a vibration-free fashion to the frame 320 shown by phatom line through the buffer body 32. The slider 14 fixed to a boss 33 is in contact with the stator 6, and the boss 33 is journaled by a shaft 5. A pressure adjusting screw 34 is mounted on the top end part of the shaft 5 with a rose plate spring 35 thereunder. By tightening this screw, the rose plate spring 35 bends and the above-mentioned stator 6 can be brought in contact with the above-mentioned slider 14 by an arbitrary pushing pressure. Resultantly, torques ranging from several tens of gf.cm to thousands of gf.cm could be obtained. In addition, a fixed ring 36 is fixed onto the slider 14, and rotation is transmitted to an object body to be rotated by holding the object body between a guide ring 37 as shown by phantom lines and the fixed ring 36.

Figure 14:
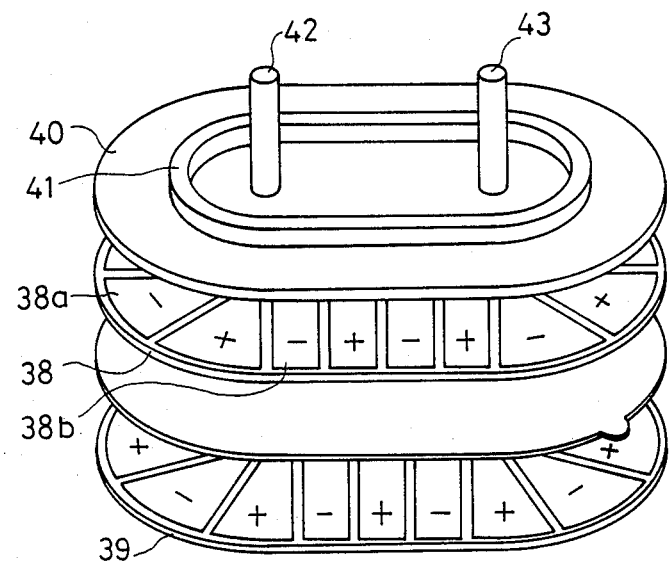
FIG. 14 is an exploded perspective view of a stator of a piezoelectric linear motor in one embodiment in accordance with the present invention.

Next, detailed description is made of the piezoelectric linear motor in accordance with the present invention in reference to the drawings. The stator, for example, has a structure as shown in FIG. 14. On the surface of a first piezoelectric vibrator 38 of an oval shape such that a rectangular part is connected to semicircle parts at both ends, for example, eight electrodes 38a, which are arc shape regions divided into every 45° are installed in the circular part. Electrodes 38b having a circumferential length substantially equal to the ½ of radius of the electrode 38a are installed in the rectangular part. These electrodes 38a and 38b are formed on the surface of the first piezoelectric vibrator 38 by such a method as printing, vacuum evaporation, plating or the like using a conductive material such as silver, silver palladium, rhodium, nickel or the like. Electrodes to be provided on the back surface (not illustrated) may be or may not be divided like the above-mentioned surface electrodes. Polarization is performed so that the adjacent first piezoelectric vibrators 38 constituted as described above have different polarization in the direction of plate thickness from one another. Consequently, as shown in FIG. 14, a 16-pole, 8-pair forced vibrator is constituted so as to have regions having the positive polarity and the negative polarity alternately. The electrodes 38a are connected so as to be applied the voltage in a lump. An oval second piezo-electric vibrator 39 is made to have the same structure and having the positive polarity and the negative polarity in alternating manner is made.

A central position of each electrode of the above-mentioned first piezoelectric vibrator 38 is in the vicinity of the position of boundary between adjacent electrodes of second the second vibrator 39. Then, both the piezoelectric vibrators 38 and 39 are piled up in a manner that the boundaries between adjacent electrodes which are the positions of minimum amplitude of the first piezoelectric vibrator 38 are located in the vicinities of the centers of the electrodes which are the positions of maximum amplitude of the second piezoelectric vibrator 39.

The first piezoelectric vibrator 38 and the second piezoelectric vibrator 39 constituted as described above are mounted in a piled up fashion on a stator substrate 40 having a thickness equal to 100 times that of the piezoelectric vibrator. The stator substrate 40 is formed by using an acoustic material, frictional material or the like selected from a group consisting of aluminum, brass, iron, stainless steel, quenched steel or synthetic resin material such as nylon or the like, ceramic material, glass material, composite material thereof or the like. In addition, on the surface of the above-mentioned stator substrate 40, for example, a protrusion 41 as a vibration transmitting member is formed in the vicinity of the maximum displacement position which becomes about ¼ of the diameter of the semicircular part, and shafts 42 and 43 are formed at the center of the semi-circular part.

Figure 15:
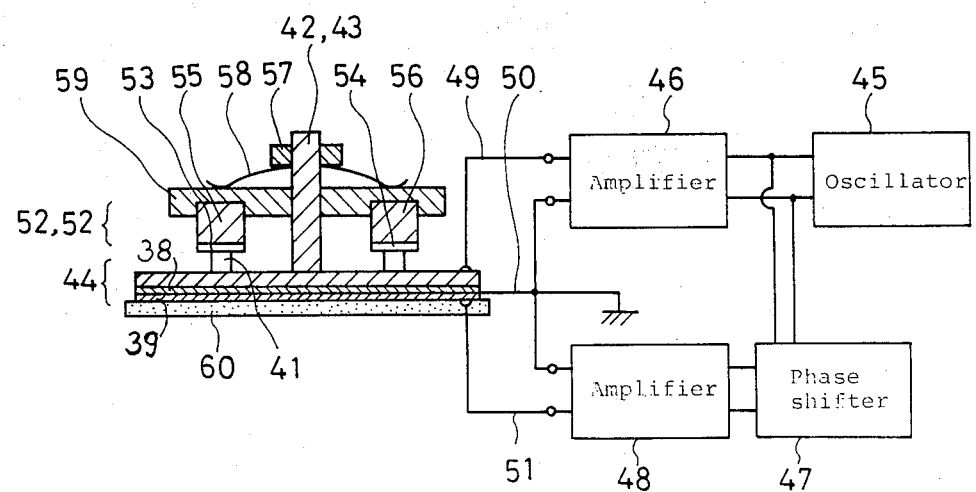
FIG. 15 is a view showing a cross-section of a piezoelectric linear motor using a stator and a driving circuit thereof.

The component assembled as described above is employed as a stator 44 as shown in FIG. 15. As shown in FIG. 15, an output signal from an oscillator 45 of a forced vibration frequency determined by the stator 44 is branched and one is inputted directly to an amplifier 46 and the other is inputted to an amplifier 48 through a phase shifter 47. The above-mentioned phase shifter 47 shifts phase of a signal by an extent of a range of ±10° to ±170° for use for the forward running or the reverse running as described later. A signal from the amplifier 46 is applied to the first piezoelectric vibrator 38 through leads 49 and 50. Consequently, in the stator 44, eight wavelengths corresponding to the 16-poles are generated. The second piezoelectric vibrator 39 is also driven likewise by applying the output voltage of the amplifier 48 through the leads 50 and 51.

Figure 16:
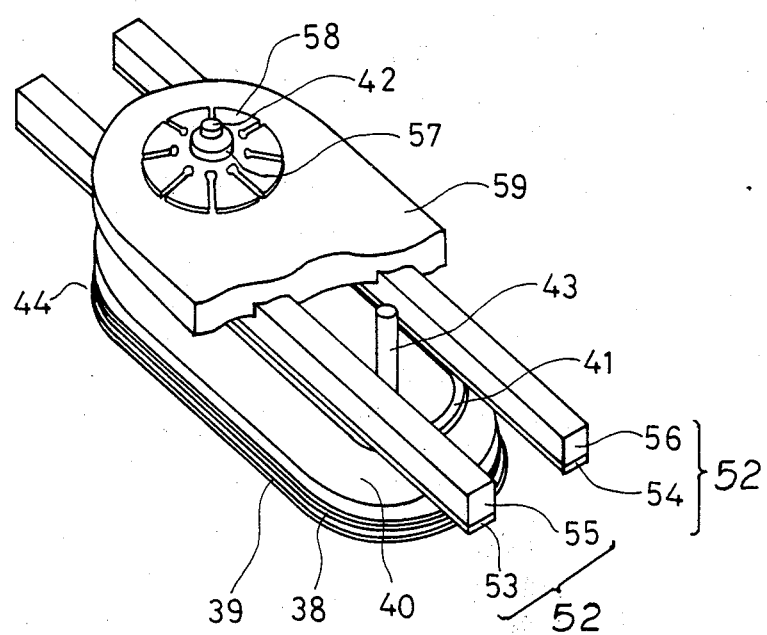
FIG. 16 is a perspective view of a slider.

The strain in the longitudinal direction was measured, and the results nearly the same as in the case of the piezoelectric rotary motor as shown in FIG. 4 were obtained. Slider 52 as shown in FIG. 15 and FIG. 16 are in contact with the stator 44. The slider 52 is constituted with elastic bodies 53 and 54 composed of a friction material, elastic material or the like and acoustic materials 55 and 56 coupled thereto. The sliders 52 are given appropriate contact force with the stator 44 by adjustment of a pressure adjusting screw 57 so that a plate spring 58 is deformed, and a desired pushing pressure is applied through a guide 59.

When the stator 44 is driven as described above, a peak of vibration of the side facing the slider 52 of the stator 44 is brought in contact with the slider 52, and also this peak moves with time, and therefore a force having the component in the transverse direction is applied to the slider 52. Thus, the slider 52 repeats positional movement by the component in the transverse direction by a driving frequency determined by the stator, and resultantly any running motion within a range between the orders of magnitude of hundreds of mm per minute to several tens meters per minute can be obtained. In this case, the slider composed of the elastic body 53 and the acoustic material 55 and the slider composed of the elastic body 54 and the acoustic material 56 run in directions opposite to each other. The generated torque varies depending upon the acoustic material constituting the stator and the coefficient of friction, contact area and the magnitude of load of the slider in surface contact with the stator and the like. And torques ranging from several tens of gf.cm to thousands of gf.cm could be obtained. Furthermore, as to the direction of travel, provided that the travel obtained when driven by applying the signal phase-shifted from the reference signal in a range of +10° to +170° to the second piezoelectric vibrator is defined as the run in the forward direction, then the direction of the run obtained by simultaneously applying the signal with phase-shifted from reference signal in a range of −10° to −170° becomes the reverse direction. Also, the travelling speed can be selected arbitrarily by selecting the magnitude or phase of the signal to be applied or the magnitude or phase of the signal to be applied or the amount of the load onto the contact part.

The strain in the vertical direction with the electric signal applied to the stator 44 was measured as the change in shorter width of the stator, and the same results as in the case of the piezoelectric rotary motor as shown in FIG. 5 were obtained.

Furthermore, by wiring the leads 49, 50 and 51 for applying the electric signal in the vicinity of the above-mentioned vibration node, breaking due to vibratory fatigue was eliminated completely. Also, for the practical structure, a buffer body 60 is provided under the stator 44. In this case, the above-mentioned stator 44 bends with the buffer body 60 acting as a substrate likewise in the case of FIG. 5, and therefore, apparent amplitude is enlarged.

As a result, the transverse component to make the driving force of the slider 52 at the protrusion 41 is increased, and the above-mentioned slider 52 moves very efficiently in a specified direction.

Furthermore, by locating the position of support in the vicinity of the vibration node, a drive with a small loss can be realized.

Figure 17:
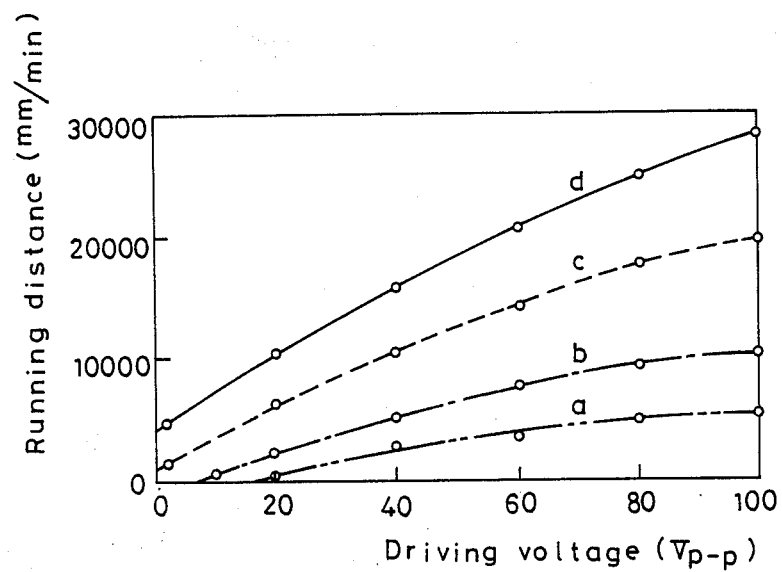
FIG. 17 is a graph showing characteristics of running distance versus driving voltage of a piezoelectric linear motor in accordance with the present invention.

FIG. 17 shows relationships between the driving voltage and the running distance of the piezoelectric linear motor in accordance with the present invention. A curve a shows a characteristic of the rotating speed converted into the running distance of the conventional surface waveform piezoelectric motor for comparison. A curve b shows a characteristic of a piezoelectric linear motor without the protrusion in accordance with the present invention, a curve c shows a characteristic of a piezoelectric linear motor in accordance with the present invention wherein the vertical length (i.e. height) of the protrusion is 4 mm, and a curve d shows a characteristic of a piezoelectric linear motor in accordance with the present invention wherein the vertical length of the protrusion is 8 mm, respectively. Thus, by varying the vertical length of the protrusion 41 of the stator, various desired travelling speed could be obtained. These show that the linear motor in accordance with the present invention is extremely efficient. In FIG. 17, the maximum speed is 28,000 mm/min, however a speed of about 80,000 mm/min could be measured in a trial unit with a smaller outer diameter. In addition, the power consumption at this invention became about 1/10–1/200 in comparison with that of the conventional piezoelectric motor. Furthermore, the power efficiency also became better in relation to that of the DC micro-motor or the like.

Figure 18:
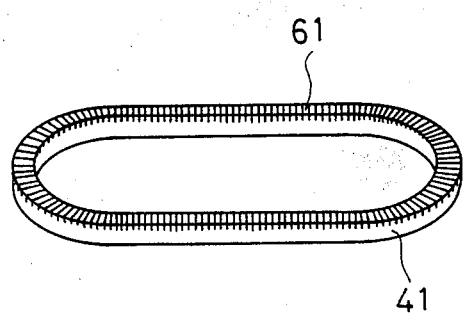
FIG. 18 is a perspective view of the major part of a stator of the same linear motor.

FIG. 18 shows one example of configuration of the protrusion 41 forming part of the stator. On the surface of the protrusion 41, which is in contact with the slider 52, a plurality of knife-edged grooves 61 are provided in the radial direction, i.e., orthogonal to the direction of movement of the above-mentioned slider 52, which, for example, are etched or machine-worked with a pitch of every 1° to several tens degrees in central angle of the circular part or every several μm to several cm. Consequently, an effect of cleaning the powder produced by wear due to relative motion of the protrusion 41 and the slider 52 is obtained. The powder by wear is led in the above-mentioned protrusion 61 to be carried outside. As a result, both contact surfaces of the above-mentioned protrusion 41 and the slider 52 could keep the initial coefficient of friction and contact area and the generated torque became always constant. As shown in FIG. 18, the operating time when the knife-edged grooves for cleaning the powder by wear due to rotation are provided on the protrusion 41 resulted in nearly the same as in the case of the piezoelectric rotary motor. The results of the run for 1,000 hours or more can assure of the keeping the initial characteristics. Revolving speed of the conventional piezoelectric motor in the stable operating region is limited to several rpm to about 30 rpm. This is based on the driving principle of the surface waveform using a very small amplitude of submicron, and the conventional piezoelectric motor features a low speed, and aims at driving the camera lens or the like.

The piezoelectric linear motor in accordance with the present invention which employs the space wave or bulk wave directly to make a strong vibration can achieve a travelling speed of about 18,000 mm/min at a driving voltage of 50V, when the height of the protrusion 41 as shown in FIG. 14 is, for example, about 8 mm.

Figure 19:
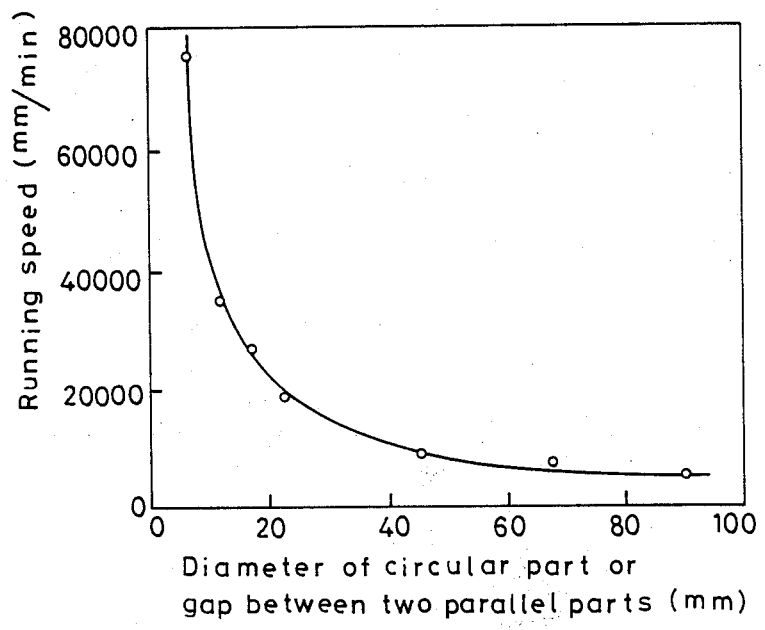
FIG. 19 is a graph showing a characteristic of running speed versus diameter or two-surface width of the major part of a stator of a piezoelectric linear motor in accordance with the present invention.

FIG. 19 shows a relationship between the above-mentioned diameter i.e. gap between two parallel parts, and the running speed when the diameter of the circular part or the gap of the parallel parts of the above-mentioned protrusion 41 is varied. In the piezoelectric linear motor in accordance with the present invention as is obvious from FIG. 19, various desired running speed is obtainable arbitrarily by selecting the diameter, the gap or the height of the protrusion 41 from several hundreds of mm/min to several tens of m/min. Furthermore, the travelling speed can be increased also by raising the voltage since the linear characteristic is kept up to about 200V of driving voltage. In addition, since no magnetic means such as a magnet, coil or the like is used at all for the configuration principle or configuration parts, for example, for a linear motor of about 3,000 mm/min to 5,000 mm/min, an ideal piezoelectric linear motor having no magnetic flux at all is obtainable, and such linear motor is especially suitable for magnetic recording/reproducing equipment such as a floppy disk, videotape recorder or the like.

Figure 20:
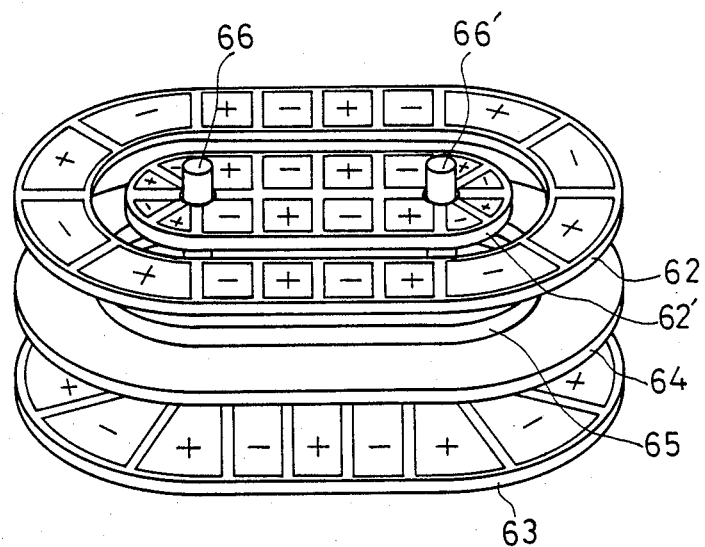
FIGS. 20, 21 and 22 are exploded perspective views of stators of a piezoelectric linear motor in other embodiments in accordance with the present invention, respectively.

FIG. 20 shows a stator having another configuration. The base of this configuration is that a stator substrate 64 having a thickness equal to about 100 times that of the above-mentioned piezoelectric vibrator is provided between a first piezoelectric vibrators 62 and 62' and a second piezoelectric vibrator 63. Also, on the surface of the above-mentioned stator substrate 64, a protrusion 65 is formed in the vicinity of the maximum displacement position of about ¼ of the diameter of the circular part, and shafts 66 and 66' are formed at the center of the circular part. The material and structure of each member are the same as those of the embodiment in FIG. 14. The relative arrangement of polarization of the first piezoelectric vibrator 63 is quite the same as that of the stator 44 constituted as shown in FIG. 14 and FIG. 15. The reason why the first piezoelectric vibrators 62 and 62' are divided into such two sheets configuration and they have oval gap and two small holes is for penetration of the protrusion 65 and the shafts 66 and 66' therethrough. In addition, for the driving circuit of this stator, quite the same configuration as that of the circuit as shown in FIG. 15 can be used, and therefore redundant detailed description is omitted.

Figure 21:
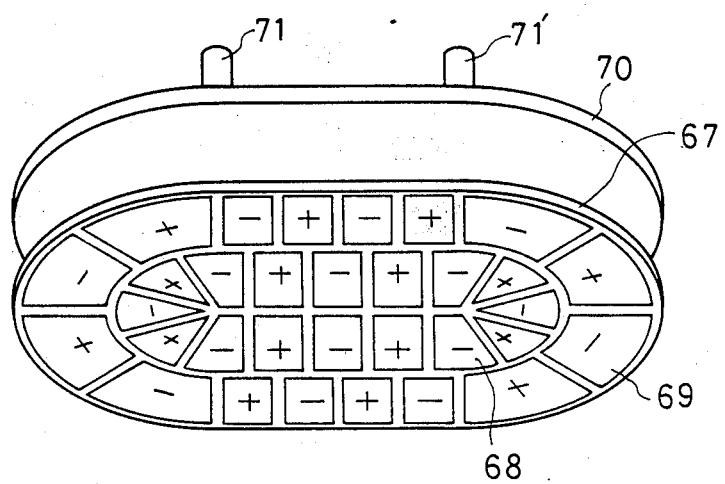

FIG. 21 shows a stator in still another embodiment. The basic configuration of the present embodiment is that a piezoelectric vibrator 67 having a first piezoelectric vibrator electrode 68 and a second piezoelectric vibrator electrode 69 and a stator substrate 70 having a thickness equal to about 100 times that of the above-mentioned piezoelectric vibrator are provided. Also, on the surface of the above-mentioned stator substrate 70, an oval protrusion (not illustrated) and shafts 71 and 71' are formed in the vicinity of the maximum displacement position of about ¼ of diameter. The material and structure of each member are the same as those of the embodiment in FIG. 14. The relative arrangements of polarization of the first piezoelectric vibrator electrode 68, the second piezoelectric vibrator electrode 69 and the like are quite the same as that of the stator 44 constituted as shown in FIG. 14 and FIG. 15. In addition, for the driving circuit of the stator, quite the same configuration as that of the circuit as shown in FIG. 15 can be used, and therefore redundant detailed description is omitted.

Figure 22:
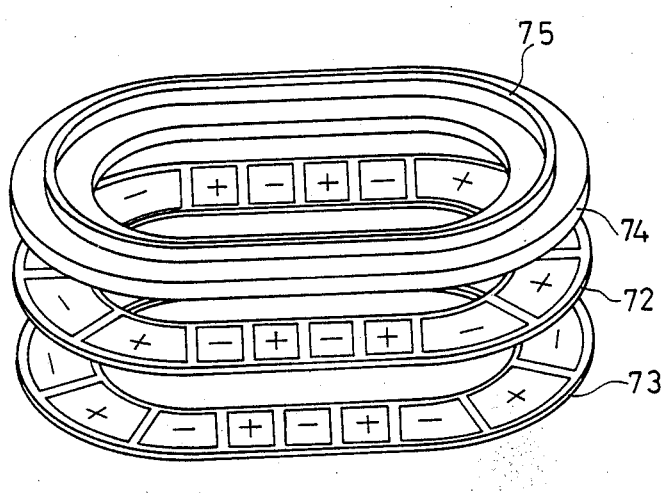

FIG 22 shows a stator in still another embodiment. The basic configuration of the present embodiment is to provide an annular stator substrate 74 having a thickness equal to about 100 times that of the above-mentioned piezoelectric vibrator on an oval first piezoelectric vibrator 72 and an oval second piezoelectric vibrator 73. Also, an oval protrusion 75 is formed in the vicinity of the position of the maximum amplitude of the longitudinal direction of the above-mentioned stator substrate 72. The material and structure of each member are the same as those of the embodiment in FIG. 14. The relative arrangements of polarization of the first piezoelectric vibrator 72 and the second piezoelectric vibrator 73 are quite the same as that of the stator 44 constituted as shown in FIG. 14 and FIG. 15. In addition, for the driving circuit of this stator, quite the same configuration as that of the circuit as shown in FIG. 15 can be used, and therefore detailed description is omitted. The strain in the longitudinal direction at an application of 50V at a forced vibration frequency determined by each stator to the stator in FIG. 20, FIG. 21 and FIG. 22 was measures using the driving circuit in FIG. 5, and the measurement results in quite the same as those as shown in FIG. 4 and FIG. 5. By making a piezoelectric linear motor using those stators and having nearly the same configuration as that of the piezoelectric linear motor of FIG. 15 as described above, running motions ranging from several hundreds mm/min to several tens m/min could be obtained. The generated torque varies depending upon the above-mentioned acoustic material constituting the stator and the coefficient of friction, contact area and the amount of load of the slider in surface contact with the above-mentioned stator or the like. The torques ranges from several tens of gf.cm to several thousands of gf.cm.

The piezoelectric linear motor constituted as described above not only occupy a small housing area, but also enables easy switching in driving direction only by varying phase-shift of the driving signal, and also a torque of up to about several thousands of gf.cm can be generated at a low or medium running speed of up to about 80,000 mm/min. Furthermore, the running speed can be selected arbitrarily up to about 100,000 mm/min by selecting the magnitude or phase of the signal to be applied, the magnitude or phase of the signal to be applied, the amount of the load onto the contact part, or the height, diameter or the gap between the parallel parts of the protrusion, etc. Accordingly, no reduction gear or the like is required at all. Furthermore, since the structure is always of a contact friction pair, this motor has a small moment of inertia and compactness.

What is claimed is:

1. A piezoelectric motor comprising:
a ring-shaped stator having: (a) an acoustic substance member of a circular configuration, and (b) piezoelectric vibrating means coupled to said acoustic substance member for generating a bending vibration wave travelling in a circumferential direction on said member;
a circular vibration transmitting member formed on said stator, the location of which member in a radial direction of said stator is adjacent to a portion at which the displacement of said stator due to said bending travelling wave is maximum in said radial direction;
a slider disposed with a contact surface thereof facing said stator, so as to contact with said vibration transmitting member, thereby receiving a friction driving force in a direction substantially parallel to a face of said stator; and
supporting means for supporting said stator in the vicinity of a node of said vibration thereof.

2. A piezoelectric motor in accordance with claim 1, wherein
said piezoelectric vibration means has a pair of piezoelectric elements, each having regions of alternating polarizations, boundaries between regions on one piezoelectric element being disposed at positions in the vicinity of centers of regions on the other piezoelectric element, and said acoustic substance member being laminated with said piezoelectric elements.

3. A piezoelectric motor in accordance with claim 1, wherein
a diameter of said vibration transmitting member is several mm to several tens of mm.

4. A piezoelectric motor in accordance with claim 1, wherein
a thickness of said acoustic substance member is equal to about one hundred times a thickness of said piezoelectric element.

5. A piezoelectric motor in accordance with claim 1, wherein
said vibration transmitting member is made of a material chosen from the group consisting light alloy, synthetic resin and natural and synthetic rubber.

6. A piezoelectric motor in accordance with claim 1, wherein
said vibration transmitting member has a plurality of grooves of a depth of several $\mu$m to several tens $\mu$m on its face, which contact said slider.

7. A piezoelectric motor in accordance with claim 2, wherein
said regions have substantially equal areas.

8. A piezoelectric motor in accordance with claim 1, wherein
two electric signals having a predetermined phase difference therebetween are impressed on said two piezoelectric elements respectively.

9. A piezoelectric motor in accordance with claim 1, further comprising
a shaft passing through the center of said stator perpendicular to said radial direction of said acoustic substance member.

10. A piezoelectric motor in accordance with claim 1, wherein
said slider includes an elastic member which is disposed on a side of said stator and which is coupled to said acoustic substance.

11. A piezoelectric motor in accordance with claim 1, further comprising
lead wires for applying an electric signal to said piezoelectric vibrating members, connected in the vicinity of a node of vibration thereof.

12. A piezoelectric motor in accordance with claim 1, wherein
said vibrating member includes holding means for holding said vibrating member in the vicinity of a node of vibration thereof.

13. A piezoelectric linear motor comprising:
a stator having: (a) an acoustic substance member of an oval configuration having a radial direction defined by a radius of said member and (b) piezoelectric vibrating means coupled to said acoustic substance member for generating a bending vibration wave travelling in a circumferential direction on said member;
a vibration transmitting member formed on said stator in an oval shape, which is disposed parallel to said radial direction adjacent a contact portion of said stator at which a maximum displacement of said stator due to said bending travelling wave occurs; and a slider disposed with a contact surface thereof facing said stator, so as to contact said vibration transmitting member, to receive a friction driving force in a direction substantially parallel to a face of said stator.

14. A piezoelectric linear motor in accordance with claim 13, wherein said stator has a pair of sheet-shaped piezoelectric elements, each having regions of alternating polarizations, boundaries between regions on one piezoelectric element being disposed at positions in the vicinity of centers of regions on the other piezoelectric element, and said member of acoustic substance being disposed between two neighboring piezoelectric elements to form a lamination.

15. A piezoelectric linear motor in accordance with claim 13, wherein gaps formed between parallel parts of said vibration transmitting member are of a size of several mm to several tens of mm.

16. A piezoelectric linear motor in accordance with claim 13, wherein a thickness of said vibration transmitting member is about a hundred times a thickness of said piezoelectric element.

17. A piezoelectric linear motor in accordance with claim 13, wherein said vibration transmitting member is made from a material from the group consisting of light alloy, synthetic resin or natural or synthetic rubber.

18. A piezoelectric linear motor in accordance with claim 13, wherein said vibration transmitting member has a plurality of grooves of several μm to several tens of μm depth on its face to contact said slider.

19. A piezoelectric linear motor in accordance with claim 14, wherein said regions have substantially equal areas.

20. A piezoelectric linear motor in accordance with claim 13, wherein two electric signals having a predetermined phase difference therebetween are impressed on said two piezoelectric elements respectively.

21. A piezoelectric linear motor in accordance with claim 13, wherein said stator has two shafts respectively passing near the center of the semi-oval shape of said stator.

22. A piezoelectric linear motor in accordance with claim 13, wherein said slider has an elastic member which is disposed on the side of said stator and is coupled to said acoustic substance.

23. A piezoelectric linear motor in accordance with claim 13, further comprising lead wires for applying an electric signal to said piezoelectric vibrating members, connected to said vibrating members in the vicinity of a node of vibration thereof.

24. A piezoelectric linear motor in accordance with claim 13, wherein said vibrating member has a holding means which holds said vibrating member in the vicinity of a node of vibration thereof.

25. A piezoelectric motor in accordance with claim 13 which further comprises a vibrating transmitting member of a ring shape in the vicinity of said location of maximum displacement.

26. A piezoelectric linear motor comprising:

a stator which has a face which undergoes displacement from a rest position at different locations thereof, and having: (a) at least two piezoelectric vibrating members, and (b) at least one member formed of an acoustic substance;

a slider disposed adjacent said stator, and which contacts said stator at a friction contact location, which friction contact occurs at a location of said stator face which is undergoing maximum displacement from said rest position, to render a motion to said slider in a direction substantially parallel to said face of said stator; and a vibration transmitting member of an oval shape, disposed in the vicinity of said location of maximum displacement.

27. A piezoelectric linear motor in accordance with claim 26, wherein a gap is formed between parallel parts of said vibration transmitting member, of a size between several mm to several tens mm.

28. A piezoelectric linear motor in accordance with claim 26, wherein thickness of said vibration transmitting member is equal to about hundred times a thickness of said piezoelectric element.

29. A piezoelectric linear motor in accordance with claim 26, wherein said vibration transmitting member is made of a material from the group consisting of light alloy, synthetic resin or natural or synthetic rubber.

30. A piezoelectric linear motor in accordance with claim 26, wherein said vibration transmitting member has a plurality of grooves of several μm to several tens μm depth on its face to contact said slider.

31. A piezoelectric linear motor in accordance with claim 26, wherein each of said piezoelectric vibrating member is of oval shape.

32. A piezoelectric linear motor in accordance with claim 26, wherein two electric signals having a predetermined phase difference therebetween are impressed on said two piezoelectric elements.

33. A piezoelectric linear motor in accordance with claim 26, further comprising a shaft passing through the center of said stator.

34. A piezoelectric linear motor in accordance with claim 26, wherein said slider has an elastic member which is disposed on the side of said stator and is coupled to said acoustic substance.

35. A piezoelectric linear motor in accordance with claim 26, further comprising lead wires for applying electric signal to said piezoelectric vibrating members and which are connected in the vicinity of a node of vibration thereof.

36. A piezoelectric linear motor in accordance with claim 26 wherein said vibrating member includes holding means for holding said vibrating member in the vicinity of node of vibration thereof.

* * * * *